Jan. 11, 1927. 1,613,768
H. PERROT
WHEEL MOUNTING
Filed Oct. 7, 1924 2 Sheets-Sheet 1

INVENTOR
HENRI PERROT
BY
A. D. T. Libby
ATTORNEY

Jan. 11, 1927.  H. PERROT  1,613,768
WHEEL MOUNTING
Filed Oct. 7, 1924    2 Sheets-Sheet 2
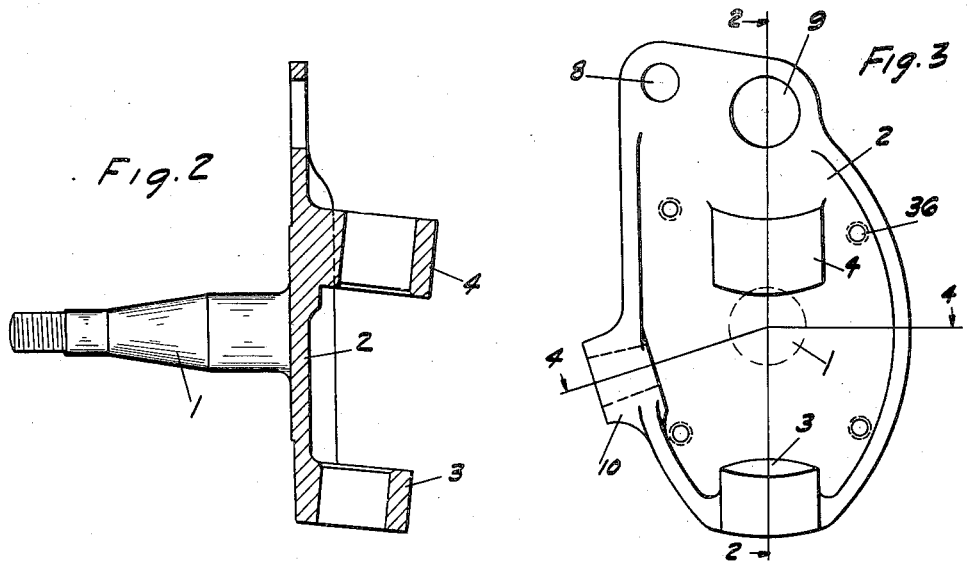
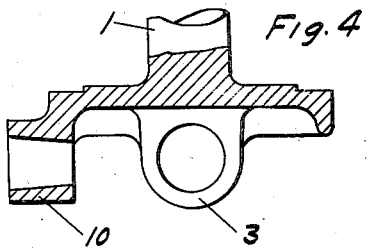
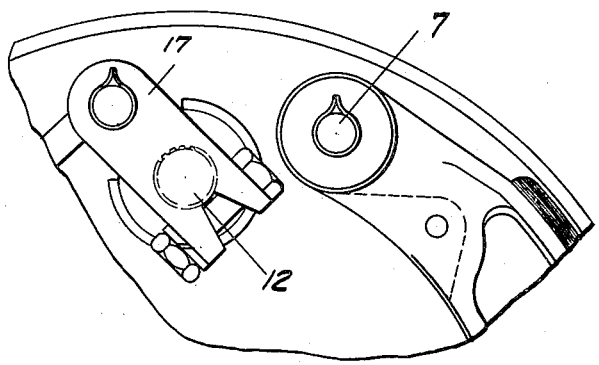
INVENTOR
HENRI PERROT
BY
A. D. S. Libby
ATTORNEY Patented Jan. 11, 1927.

1,613,768

UNITED STATES PATENT OFFICE.

HENRI PERROT, OF PARIS, FRANCE.

WHEEL MOUNTING.

Application filed October 7, 1924. Serial No. 742,157.

This invention relates to the construction of a vehicle wheel mounting and means for lubricating the pivotal parts included with the mounting.

As illustrated in the drawings attached hereto, my invention is particularly adapted for use in connection with the front wheels of an automotive vehicle, in connection with which brakes are used. From many standpoints, internal brakes are preferable for the front wheels of an automobile, but the mounting of brakes on front wheels is far from a simple problem.

It is therefore, one of the objects of my invention to provide a wheel mounting comprising a spindle for the wheel and a plate integral with the spindle, which plate can be utilized for mounting the brakes; also the same plate carries integral parts which support the end of the axle through the medium of suitable bearings and a pivot or what is commonly termed a king pin.

Another object of my invention is to provide means for securely holding the king pin in position in the end of the axle, which means also serves the double function of passing lubricant to the king pin, which is made hollow preferably from end to end.

Another object of my invention is to provide means associated with the king pin and its bearings for preventing the lubricant from escaping, thereby more nearly insuring proper lubrication of these parts.

These and other objects will be clear from the following description taken in connection with the annexed drawings wherein:

Figure 2 is a section on a much reduced scale of the wheel spindle and integral plate, taken on the line 2—2 of Fig. 3.

Figure 3 is a right hand end view of Fig. 2.

Figure 4 is a section on the line 4—4 of Fig. 3; while

Figure 5 is a fragmentary left hand end view of Fig. 1, showing the brake anchorage and part of the brake operating means.

Figure 1:
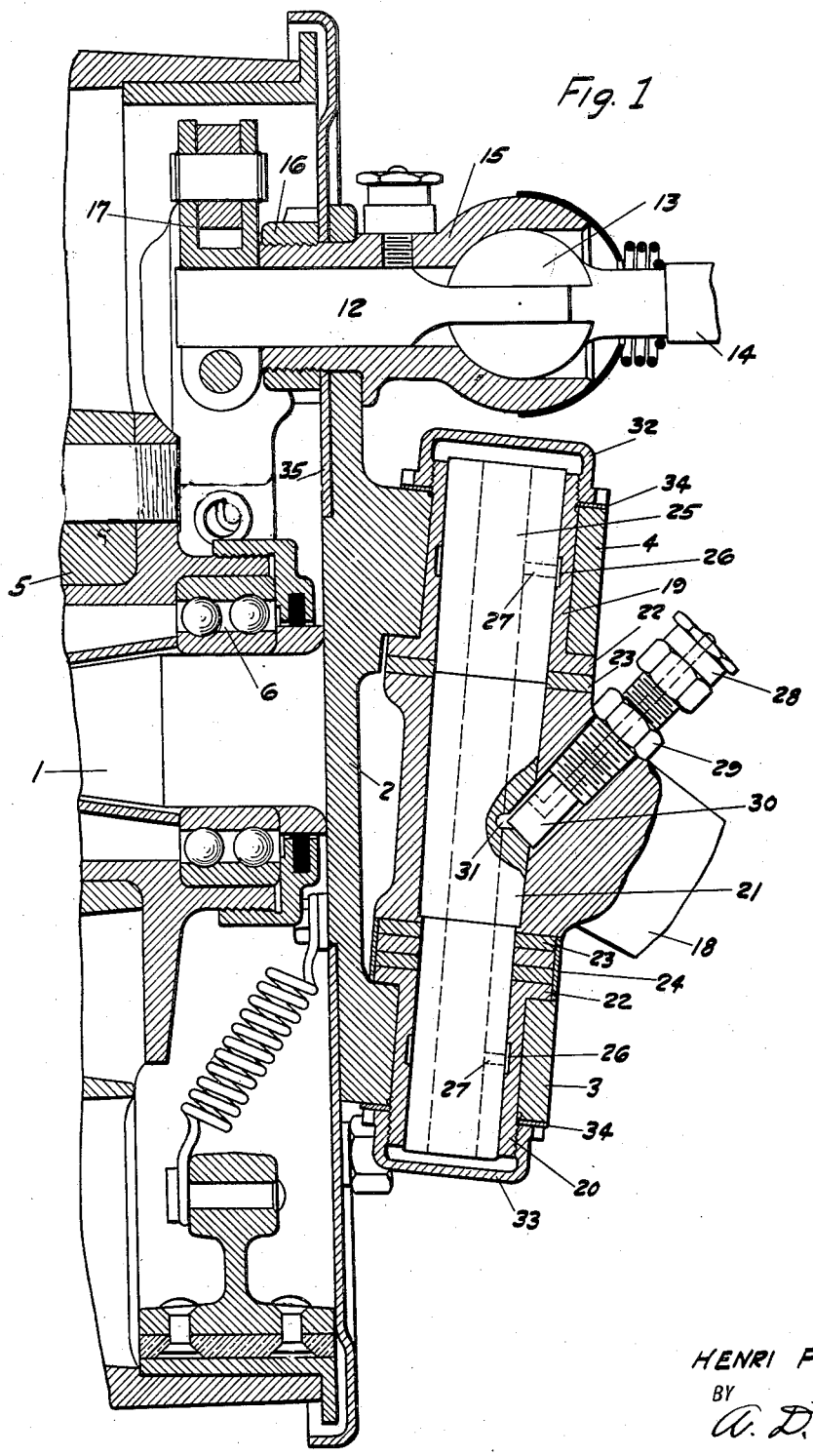
Figure 1 is a sectional view of the wheel support associated with the end of the axle.

Referring now to the details, wherein like numbers refer to corresponding parts in the various views, 1 is a wheel spindle having an integral plate 2 with bosses 3 and 4 thereon. The plate also carries a boss 10 to which is attached a steering arm. The spindle 1 carries a wheel generally referred to as 5, one of the bearings 6 being shown. The plate 2 extends away from the spindle 1 preferably in an upward direction as indicated for the purpose of supporting the brakes, which are preferably of the self-energizing type in which the brake anchorage 7, for what is generally termed the secondary shoe, passes through the orifice 8; while the brake operating mechanism or its bearing is positioned in orifice 9 in the plane of bosses 3 and 4. The brake operating mechanism preferably consists of an operating shaft 12 connected through a universal joint 13 with a control shaft 14, the inner end of which is usually supported on the side of the chassis in any satisfactory manner. The operating member 12 is carried in a member 15 which fits the hole 9, being clamped to the plate 2 by a nut 16. On the end of the operating shaft 12 is a member 17 which connects with the free end of one of the brake shoes.

The end of the axle 18 is positioned between the bosses 3 and 4 in which are positioned similarly shaped bearing bushings 19 and 20. The end of the axle 18 preferably has a tapered hole to receive the king pin 21, which has a tapered portion substantially equivalent to the thickness of the axle. The upper end of the pin 21 is tapered also and the lower end may be straight to form bearing surfaces in the bushings 19 and 20. Each of the bushings is provided with a flange 22 on the end toward the axle. Between these flanges and the axle are disposed suitable bearing members 23, one or more of these being used at the bottom part of the axle, all being enclosed within a collar 24, which preferably fits snugly over the flange 22 of the bushing 20. It is to be noted that the pin 21 has a hollow portion 25 extending from end to end, while each of the bushings 19 and 20 are provided with an annular groove 26 and a passageway 27 leading from the annular groove to the hollow part of the pin, whereby lubricant is carried to the bearing surfaces between the ends of the king pin and the bushings 19 and 20. Of course the grooves may be made in the pin itself and accomplish a similar result.

A lubricator 28 of any desired type is screw threaded into the end of the axle and is locked in placed by a nut 29, while the end 30 of the lubricator extends into the tapered portion of the pin 21 in such a manner as to tend to continuously force the pin 21 on to its tapered seat. This lubricator may be of a type in which force lubrication is used whereby lubricant can be forced into the grooves 26 and 27 as well as elsewhere. This construction also helps to keep the pin 21 from turning in its seat. A passageway 31 is provided, leading from the hollow part 25 of the pin to the lubricant passageway of the lubricator. In order to keep dust and dirt out of the king pin bearings and to hold the lubricant within the parts described, the ends of the bushings 19 and 20 are extended and preferably threaded to receive caps 32 and 33, packing washers 34 being utilized to seal the joints tightly between the caps and the bosses.

It will thus be seen that I have provided very effective means for mounting and lubricating the wheel spindle as well as providing a very rigid support for the brake mechanism, as it is to be understood that the preferable way of making the integral spindle and plate is from a drop forging. As will be clearly seen from Fig. 1, the spindle side of the plate is preferably smooth to receive a cover plate 35 for the drum, the same being fastened to plate 2 through the medium of the screw holes 36 shown in dotted lines, Fig. 3.

It will be further understood that various changes may be made in the detail construction entering into my invention without departing from the spirit of the same and the scope of the appended claims.

Having thus described my invention, what I claim is:

1. The combination with an integral wheel spindle and plate having bosses thereon, an axle positioned between said bosses, a pivot pin supported in said axle and passing through said bosses and a combined holding pin and lubricator positioned in the axle and extending into said pivot pin.

2. In combination with an integral wheel spindle and plate having bosses thereon, an axle positioned between said bosses, a hollow pivot pin carried in the end of said axle and projecting through said bosses, bushings in said bosses on said pin ends, each of said bushings having at least one annular lubricant retaining groove intermediate its ends with a passage in the pin leading from the groove to the hollow of the pin, a lubricator positioned in the end of the axle and pushing downward on the pin and a passage leading from the lubricator to the hollow part of the pin, and closure caps securely attached to the ends of said bushings for the purpose described.

3. In combination with an integral wheel spindle and plate having bosses thereon, an axle positioned between said bosses, a hollow pivot pin having a tapered portion in the end of said axle and having pivot ends extending through said bosses, bearing bushings in the bosses for said pivot ends, said bushings having flanged ends toward the axle and threaded exterior ends beyond the bosses, a combined lubricator and holding pin positioned in the axle end and engaging the tapered portion of the pivot pin to draw it against its seat with a passage for carrying lubricant to the hollow part of said pin, and closure caps securely attached to the ends of said bushings for the purpose described.

4. In combination with an integral wheel spindle and plate having bosses thereon, an axle positioned between said bosses, a hollow pivot pin having a tapered portion in the end of said axle and straight portions extending into said bosses, bearing bushings in the bosses for said straight pin portions, unitary means for holding said pin on its tapered seat and for passing lubricant to the center of the hollow of the pin, and means on the ends of said bushings for retaining the lubricant.

5. In combination with an integral wheel spindle and plate having bosses thereon, an axle positioned between said bosses, a hollow pivot pin having a tapered portion in the end of said axle and having pivot ends extending through said bosses, bearing members interposed between said flanged ends and the axle end, unitary means for holding said pin on its tapered seat and for passing lubricant to the center of the hollow of the pin.

In testimony whereof, I affix my signature.

HENRI PERROT.

CERTIFICATE OF CORRECTION.

Patent No. 1,613,768.  Granted January 11, 1927, to

HENRI PERROT.

It is hereby certified that error appears in the printed specification of the above numbered patent requiring correction as follows: Page 2, lines 94 to 96, claim 5, strike out the words and comma "bearing members interposed between said flanged ends and the axle end," and insert instead the word "and"; and that the said Letters Patent should be read with this correction therein that the same may conform to the record of the case in the Patent Office.

Signed and sealed this 17th day of May, A. D. 1927.

Seal.

M. J. Moore,
Acting Commissioner of Patents.